United States Patent
Dheap et al.

(10) Patent No.: US 8,495,004 B2
(45) Date of Patent: Jul. 23, 2013

(54) DETERMINING AND STORING AT LEAST ONE RESULTS SET IN A GLOBAL ONTOLOGY DATABASE FOR FUTURE USE BY AN ENTITY THAT SUBSCRIBES TO THE GLOBAL ONTOLOGY DATABASE

(75) Inventors: Vijay Dheap, Chapel Hill, NC (US); Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1888 days.

(21) Appl. No.: 11/390,398

(22) Filed: Mar. 27, 2006

(65) Prior Publication Data

US 2007/0226246 A1    Sep. 27, 2007

(51) Int. Cl.
*G06F 7/00*      (2006.01)
*G06F 17/00*     (2006.01)

(52) U.S. Cl.
USPC ............................ 707/600; 707/797; 707/798

(58) Field of Classification Search
USPC ... 707/1, 3, 100–102, 103 R; 709/202; 705/1; 715/700
See application file for complete search history.

(56) References Cited

U.S. PATENT DOCUMENTS

| | | | |
|---|---|---|---|
| 6,092,099 A * | 7/2000 | Irie et al. .................. | 709/202 |
| 6,614,895 B1 | 9/2003 | Impey et al. | |
| 6,640,231 B1 * | 10/2003 | Andersen et al. .......... | 707/102 |
| 6,728,692 B1 | 4/2004 | Martinka et al. | |
| 6,772,180 B1 | 8/2004 | Li et al. | |
| 6,785,689 B1 | 8/2004 | Daniel et al. | |
| 6,820,075 B2 | 11/2004 | Shanahan et al. | |
| 6,823,495 B1 * | 11/2004 | Vedula et al. ................. | 715/805 |
| 6,847,974 B2 | 1/2005 | Wachtel | |
| 6,847,979 B2 | 1/2005 | Allemang et al. | |
| 7,099,885 B2 * | 8/2006 | Hellman et al. ........... | 707/103 R |
| 2002/0059289 A1 * | 5/2002 | Wenegrat et al. ............. | 707/102 |
| 2002/0173971 A1 * | 11/2002 | Stirpe et al. ....................... | 705/1 |
| 2003/0018616 A1 * | 1/2003 | Wilbanks et al. ................ | 707/2 |
| 2003/0061028 A1 | 3/2003 | Dey et al. | |
| 2003/0101170 A1 | 5/2003 | Edelstein et al. | |
| 2003/0126136 A1 * | 7/2003 | Omoigui ......................... | 707/10 |

(Continued)

OTHER PUBLICATIONS

Lei Y., An Instance Mapping Ontology for the Semantic Web, Oct. 2005, ACM, pp. 67-74.*

(Continued)

*Primary Examiner* — Charles Kim
*Assistant Examiner* — Jessica N Le
(74) *Attorney, Agent, or Firm* — Stevens & Showalter LLP (57) ABSTRACT

Determining and storing at least one validated results set in a global ontology database for future use by an entity that subscribes to the global ontology database. If global ontology data is stored in a global ontology database, attempt to determine a mapping between first and second ontologies. If a mapping between the first and second ontologies can be determined from the global ontology data, the mapping is validated and the validated mapping is defined as a validated results set. If global ontology data is not stored in a global ontology database or a mapping between the first and second ontologies can not be determined from global ontology data stored in the global ontology database, the first and second ontologies are unified by determining a mapping between the first and second ontologies, the mapping is validated and the validated mapping is defined as a validated results set. The validated results set is stored in the global ontology database for future use by an entity that subscribes to the global ontology database.

6 Claims, 4 Drawing Sheets

U.S. PATENT DOCUMENTS

| | | |
|---|---|---|
| 2003/0163597 A1 | 8/2003 | Hellman et al. |
| 2003/0172368 A1 | 9/2003 | Alumbaugh et al. |
| 2003/0177112 A1 | 9/2003 | Gardner |
| 2003/0179228 A1 | 9/2003 | Schreiber et al. |
| 2004/0083199 A1* | 4/2004 | Govindugari et al. ............ 707/1 |
| 2004/0117346 A1* | 6/2004 | Stoffel et al. ..................... 707/1 |
| 2004/0220969 A1 | 11/2004 | Cho et al. |
| 2004/0243595 A1* | 12/2004 | Cui et al. ...................... 707/100 |
| 2005/0038629 A1 | 2/2005 | Amaru et al. |
| 2005/0114758 A1 | 5/2005 | Lang et al. |
| 2005/0131920 A1 | 6/2005 | Rust et al. |
| 2005/0144177 A1 | 6/2005 | Hodes |
| 2005/0149484 A1* | 7/2005 | Fox et al. .......................... 707/1 |
| 2005/0203920 A1* | 9/2005 | Deng et al. .................... 707/100 |
| 2005/0256850 A1* | 11/2005 | Ma et al. .......................... 707/3 |
| 2006/0036633 A1* | 2/2006 | Chong et al. .................. 707/101 |
| 2006/0167856 A1* | 7/2006 | Angele et al. ..................... 707/3 |
| 2006/0167946 A1* | 7/2006 | Hellman et al. ............ 707/104.1 |
| 2006/0248458 A1* | 11/2006 | Li .................................. 715/700 |
| 2006/0271556 A1* | 11/2006 | Mukherjee et al. ............. 707/10 |

OTHER PUBLICATIONS

Doan et al., Learning to Match Ontologies on the Semantic Web, Nov. 2003, Springer-Verlag New York, Inc., vol. 12, Issue 4, pp. 303-319.*

P. Mitra, N. Noy, A. Jaiswal; OMEN: A Probabilistic Ontology Mapping Tool, The Pennsylvania State University, University Park, PA 16802, USA and Stanford University, Stanford, CA 94305, USA; smi-web.stanford.edu/people/noy/papers/omen_ISWC.pdf.

A. Doan, J. Madhavan, P. Domingos, A. Halevy; Learning to Map between Ontologies on the Semantic Web, Computer Science and Engineering, University of Washington, Seattle, WA, USA, ACM 1-58113-449-May 2, 2005; www.cs.washington.edu/homes/pedrod/papers/www02.pdf.

\* cited by examiner

DETERMINING AND STORING AT LEAST ONE RESULTS SET IN A GLOBAL ONTOLOGY DATABASE FOR FUTURE USE BY AN ENTITY THAT SUBSCRIBES TO THE GLOBAL ONTOLOGY DATABASE

BACKGROUND OF THE INVENTION

A domain of knowledge, e.g., customer and asset/financial information for banking, may be defined or organized in an ontology or format. An ontology may comprise concepts or classes, which may be organized in a tree, wherein each concept having a parent is a species of its parent, e.g., customer (parent), business customer (first species) and private individual customer (second species). Each concept may be associated with one or more instances, e.g., an instance for "business customer" may be "Ace Computer Store" and an instance for "individual customer" may be "John Doe." Each concept may also have one or more attributes. For example, the attributes for "individual customer" may comprise name, address, and social security number. Typically, different organizations operating within the same domain have different ontologies, i.e., each ontology comprises concepts and/or attributes defined differently, yet may receive similar or substantially the same information. In order to enable two organizations or entities to interact with one another and exchange information, mappings between their different ontologies are required.

BRIEF SUMMARY OF THE INVENTION

The present invention provides a method, computer program product and a data processing system for determining and storing at least one validated results set in a global ontology database for future use by an entity that subscribes to the global ontology database. It is determined if global ontology data is stored in a global ontology database. If global ontology data is stored in a global ontology database, attempt to determine a mapping between first and second ontologies. If a mapping between the first and second ontologies can be determined from the global ontology data, the mapping is validated and the validated mapping is defined as a validated results set. If global ontology data is not stored in a global ontology database or a mapping between the first and second ontologies can not be determined from global ontology data stored in the global ontology database, the first and second ontologies are unified by determining a mapping between the first and second ontologies, the mapping is validated and the validated mapping is defined as a validated results set. The validated results set is stored in the global ontology database for future use by an entity that subscribes to the global ontology database.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
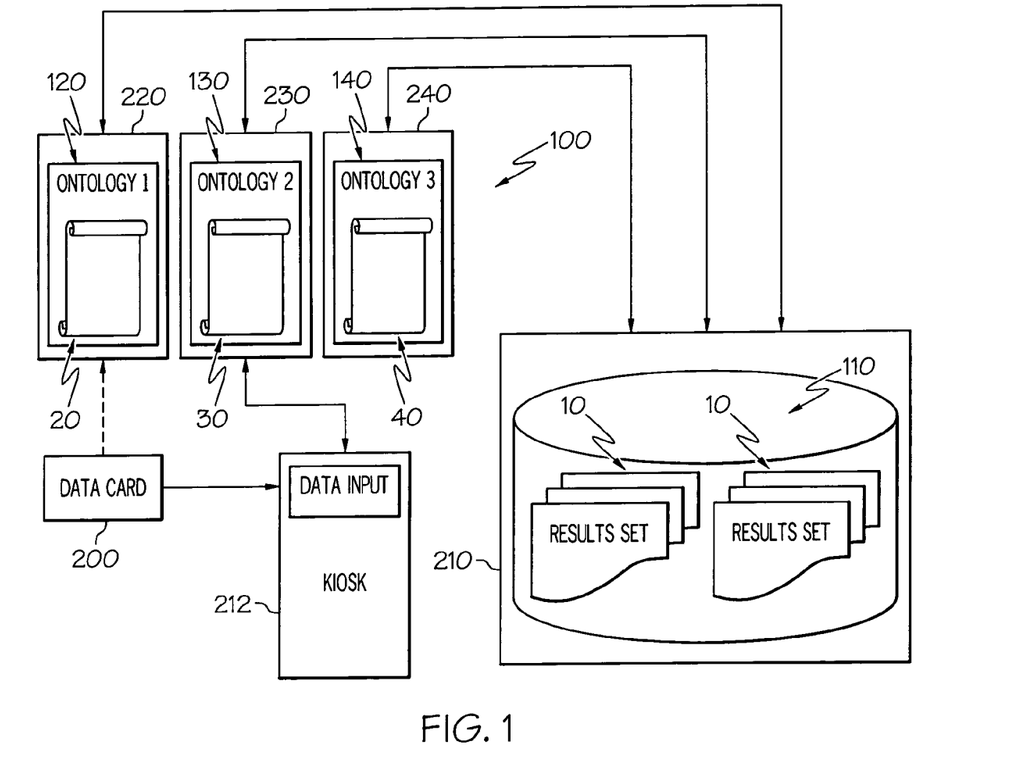
FIG. 1 is a pictorial representation of a system in which the present invention may be implemented.

With reference now to the figures, FIG. 1 depicts a pictorial representation of a system 100 in which the present invention may be implemented. In the illustrated embodiment, the system comprises global ontology data 10 stored in a global ontology database 110 and first, second and third ontologies 20, 30 and 40 stored respectively in first, second and third entity databases 120, 130 and 140. The databases 110, 120, 130 and 140 may be stored in separate computer systems 210, 220, 230 and 240, wherein each computer system may comprise one or more suitable input devices, output devices, processors, memory, or other components for receiving, processing, storing, and communicating information. In the illustrated embodiment, each of the first, second and third entity databases 120, 130 and 140 is associated with a corresponding entity, e.g., a financial institution, and is geographically remote from the other entity databases as well as from the global ontology database 110. The global ontology database 110 may be associated with a standards body or an industry organization with which the entities corresponding to the first, second and third entity databases 120, 130 and 140 are members or otherwise associated.

Each of the first, second and third ontologies 20, 30 and 40 may define a format or schema comprising one or more concepts or classes, wherein the schema corresponds to a domain of knowledge, e.g., customer and asset/financial information for banking. Each concept may be organized in a tree, wherein each concept having a parent is a species of its parent, e.g., customer (parent), business customer (first species) and private individual customer (second species). Each concept may be associated with one or more instances, e.g., an instance for "business customer" may be "Ace Computer Store" and an instance for "individual customer" may be "John Doe." Each concept may also have one or more attributes. For example, the attributes for "individual customer" may comprise name, address, and social security number. An ontology may also define a set of relations associated with its concepts. For example, financial consultant A at Financial Institution 1 may be responsible for a predefined set of individual customers. Hence, a relation of "financial consultant/individual customer" might list all pairs of "financial consultant" and "individual customer." Typically, different entities, e.g., banks, operating within the same domain of knowledge, e.g., customer and asset/financial information, have different ontologies, wherein each ontology comprises different concepts, attributes and/or relations. The term "elements" is used herein to encompass the terms "concepts," "attributes," "relations" and the like.

Figure 2:
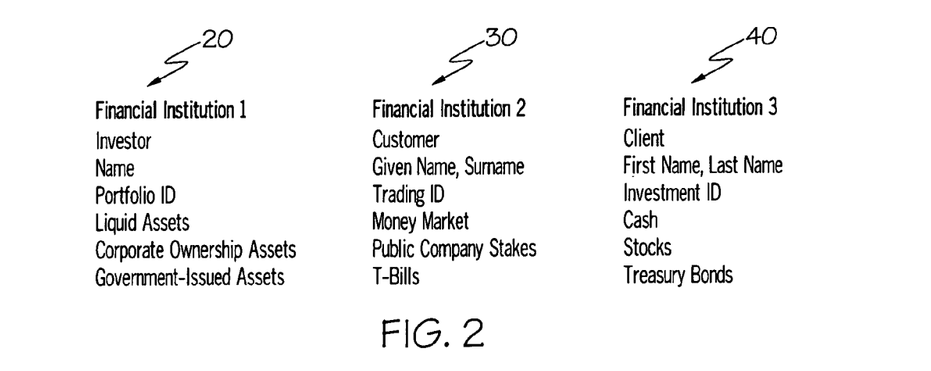
FIG. 2 is an illustration of example first, second and third ontologies.

Example elements of the first, second and third ontologies 20, 30 and 40 are illustrated in FIG. 2. The first ontology 20 corresponds to Financial Institution 1, the second ontology 30 corresponds to Financial Institution 2 and the third ontology 40 corresponds to Financial Institution 3. Financial Institution 1 may have collected or otherwise defined the information needed to complete an application or form having at least a portion of the elements in the first ontology 20 for a first customer, e.g., investor=IN1001, Name=John Doe. That information may be stored on the computer system 220, which system 220 is owned and controlled by Financial Institution 1. That information may also be stored on a data card 200, see FIG. 1, provided by Financial Institution 1 to the first customer, such as for use by the first customer at a kiosk owned and controlled by Financial Institution 1. The first customer, after receiving the data card 200, may decide to open an account and/or apply for a credit card at Financial Institution 2. In FIG. 1, a kiosk 212 is illustrated, which is owned and controlled by Financial Institution 2. The first customer, when opening an account or applying for a credit card at Financial Institution 2, may input his data card 200 into the kiosk 212 to provide personal data/financial data to Financial Institution 2. In accordance with the present invention, Financial Institution 2 submits a request to the global ontology database computer system 210 for a mapping between the first and second ontologies 20 and 30. Once the Financial Institution 2 receives the mapping from the global ontology database computer system 210, it downloads desired personal data/financial data contained on the data card 200 for its use in processing the application from the first customer.

Figure 3:
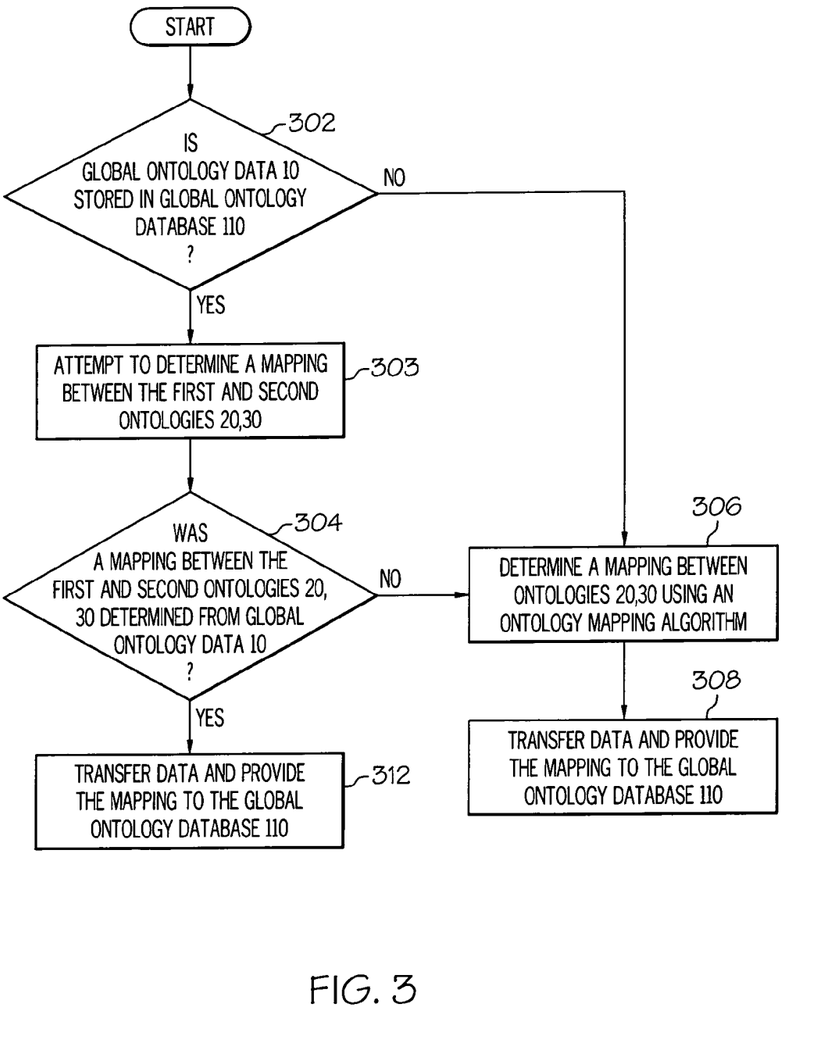
FIG. 3 is a flow chart which defines an algorithm to determine a mapping between first and second ontologies.

With reference now to FIG. 3, a flowchart is provided which defines an algorithm used by the global ontology database computer system 210 to determine a mapping between the first and second ontologies 20 and 30. In the illustrated embodiment, the computer system 230 is coupled to the kiosk 212 and the global ontology database computer system 210 either physically or logically in any suitable manner, for example, using one or more buses, local area networks (LANs), wide area networks (WAN), a global computer network such as the Internet, or any other wireline, optical apparatus, wireless apparatus, or other linking apparatus.

In step 302, the global ontology database computer system 210 determines if global ontology data 10 is stored in the global ontology database 110. If yes, and as discussed more explicitly below, the computer system 210 attempts to determine a mapping between the first and second ontologies 20 and 30, see step 303. If, in step 302, it is determined that global ontology data 10 is not stored in the global ontology database 110 or, in step 304, that a mapping between the first and second ontologies 20 and 30 can not be determined from the global ontology data 10, an ontology mapping algorithm is used by the global ontology database computer system 210 to map each relevant element in the first ontology 20, i.e., the source ontology, with the most similar element in the second ontology 30, see step 306. Ontology mapping algorithms are well known to those skilled in the art. Because Financial Institution 1 and Financial Institution 2 are subscribers to the global ontology database, the global ontology database computer system 210 is permitted access to the first and second ontologies 20 and 30 stored on the Financial Institution 1 and Financial Institution 2 computer systems 220 and 230.

The mapping between each relevant element in the first ontology 20 to the most similar element in the second ontology 30, i.e., the results of the unifying of the first and second ontologies 20 and 30, is defined as an initial or proposed results set. The global ontology database computer system 210 then forwards the initial results set to the computer system 230 owned and controlled by the Financial Institution 2.

Based on the initial results set, the computer system 230 transfers relevant personal data/financial data from the data card 200 or other memory device storing personal data/financial data for the first customer in accordance with the first ontology 20 to complete an application or form defined in accordance with the second ontology 30. The computer system 230 then transfers its completed form to the kiosk 212 for review by the first customer. The initial results set returned by the global ontology database computer system 210 to the Financial Institution 2 computer system 230 may contain errors in some of the mappings between elements of the first and second ontologies. These errors will result in either zero or incorrect personal data/financial data being input into corresponding entries on the form (created in accordance with the second ontology 30) completed by the computer system 230. Alternatively, the computer system 230 may forward the initial results set to a computer system (not shown) provided within the kiosk 212 such that the kiosk 212 performs the data transfer itself.

The kiosk 212 may display the completed form (created in accordance with the second ontology 30) to the first customer for correction of any errors. The kiosk 212 may also display a form from the Financial Institution 1 including elements from the first ontology 20 completed with personal data/financial data from the first customer. The completed Financial Institution 1 form is downloaded from the data card 200. The customer may correct the form defined in accordance with the second ontology 30 by typing in correct data and/or transferring data, e.g., drag-and-drop data, from the form (stored on the data card 200 and created in accordance with the first ontology 20) used by Financial Institution 1 to the form used by Financial Institution 2 (created in accordance with the second ontology 30). The computer system 230 interprets or infers from these changes in personal data/financial data revisions to the initial mapping generated by the ontology mapping algorithm. After all changes have been effected by the owner of the data card 200, the computer system 230 creates a validated, i.e., updated, verified and/or corrected, mapping between the first and second ontologies 20 and 30 and defines the updated, verified and/or corrected mapping as a validated final results set. The Financial Institution 2 forwards the validated results set comprising the mapping of the first and second ontologies 20 and 30 to the global ontology database computer system 210 for storage and access for future use by any entity who is a member of the standards body or the industry organization having ownership and control over the global ontology database 110, see step 308. The Financial Institution 2 may also forward to the global ontology database computer system 210 the domain of knowledge corresponding to each of the first and second ontologies 20 and 30. Typically, the personal data/financial data itself is not forwarded to the global ontology database 10.

It is noted that the global ontology database 110 dynamically "learns" each time a new mapping is provided to and stored within the global ontology database 110. As noted above, an initial mapping generated by an ontology mapping algorithm may be corrected based on information provided by a user, e.g., a customer. That is, corrections to errors in mappings between elements in the first ontology and elements in the second ontology contained in the initial results set may be inferred from corrections made by the user, e.g., a customer, to the form presented to the user by Financial Institution 2. As noted above, the user could be a customer. It is also contemplated that the user could be an employee of the entity, i.e., the financial institution. It is further contemplated that mappings between elements of the first and second ontologies 20 and 30 may be corrected by the entity by directly comparing the mappings of elements in the first ontology with corresponding elements in the second ontology such that the errors in the mappings of those elements are not inferred but, instead, are directly reviewed and determined. By correcting the mapping errors between the elements of the first and second ontologies 20 and 30, uncertainty in the initial results set is reduced, i.e., the accuracy of the mappings between the elements in the first and second ontologies is enhanced or validated.

A new mapping, when received by the global ontology database 110, is stored with other mappings already contained in the database 110. For example, a mapping between third and fourth ontologies may be generated and stored in the database 110 already containing a mapping between the first and second ontologies 20 and 30. Hence, as new mappings are provided to the global ontology database 110 over time, the number of mappings between sets of ontologies grows within the database 110. This is advantageous because, as the global ontology database 110 grows with new mappings, the probability that a desired mapping between two ontologies is contained in the database 110 increases. If a desired mapping is contained within the global ontology database 110, the time consuming steps of using a mapping ontology algorithm, as noted above, to determine a desired mapping between two ontologies, along with subsequent correction of errors in the mapping, may be avoided.

As will be discussed further below, the global ontology database 110 also "learns" when a previously determined mapping between two ontologies is requested by an entity from the global ontology database 110, wherein the entity receives that mapping and corrects or verifies, i.e., validates, mappings between elements in the ontologies that were not previously validated so as to reduce uncertainty in those mappings; updates any mappings between elements within the ontologies that have changed since those element mappings were originally validated; and/or corrects any errors in the mappings of elements that were previously not corrected when those mappings were previously validated. During each iteration of use of a mapping between two ontologies stored in the database 110 by an entity, wherein the entity validates, i.e., updates, verifies and/or corrects, the mappings between at least a portion of the elements of the ontologies, the database 110 is made more certain and accurate when the updated, verified and/or corrected, i.e., validated, mapping of the ontologies is forwarded to the database 110.

As noted above, the mapping between the first and second ontologies 20 and 30 may be validated or enhanced with each iteration of use of the mapping by an entity receiving the mapping from the global ontology database 110. For example, assume a first mapping between first and second ontologies 20 and 30 is created by an ontology mapping algorithm which maps first and second elements in the first ontology 20 to corresponding first and second elements in the second ontology 30. The initial results set is provided by the global ontology database computer system 210 to an entity, which uses the mapping to transfer personal data/financial data between forms created in accordance with the first and second ontologies. The personal data/financial data transferred between the forms, in this example, involves only first elements in the first and second ontologies 20 and 30. Hence, only corrections to the mappings between the first elements in the first ontology 20 and first elements in the second ontology 30 are inferred and effected. That is, only the mappings of the first elements in the first and second ontologies 20 and 30 are reviewed and validated by the entity. The entity returns a validated, final first results set to the global ontology database computer system 210. However, because corrections to the mappings between the second elements of the first ontology 20 and second elements of the second ontology 30 could not be inferred, the mappings between those second elements remain uncertain, i.e., the mappings had not yet been validated so as to be either verified or corrected.

Mappings between elements in a first ontology and elements in a second ontology are considered to have been "validated" by an entity when the entity infers from changes made by a user to data transferred from a form corresponding to the first ontology elements to a form corresponding to the second ontology elements revisions to incorrect mappings between the first and second ontology elements. Mappings between elements of first and second ontologies are also considered to have been "validated" by an entity when the entity directly checks for errors in the mappings between the elements of the first and second ontologies.

At a later date, a second customer, having a data card from Financial Institution 1, makes a request to open an account at Financial Institution 2 and inserts his data card into the kiosk 212. His data card contains a first portion of his/her personal data/financial data stored in accordance with the first elements in the first ontology and a second portion of his/her personal data/financial data stored in accordance with the second elements in the first ontology. The Financial Institution 2 retrieves the final first results set from the global ontology database 110, i.e., the previously determined mapping between the first and second ontologies 20 and 30 stored in the database 110. Based on the final first results set, the computer system 230 transfers relevant personal data/financial data from the data card 200 or other memory device storing personal data/financial data for the second customer in accordance with the first ontology 20 to complete an application or form defined in accordance with the second ontology 30. The computer system 230 then transfers its completed form to the kiosk 212 for review by the second customer for correction of any errors. The Financial Institution 2 may also display a form from the Financial Institution 1 including elements from the first ontology 20 completed with personal data/financial data from the second customer. The second customer may correct the form defined in accordance with the second ontology 30 by typing in correct data and/or transferring data, e.g., drag-and-drop data, from the form (stored on the data card and created in accordance with the first ontology 20) used by Financial Institution 1 to the form used by Financial Institution 2 (created in accordance with the second ontology 30). The computer system 230 interprets or infers from the changes in personal data/financial data revisions to the final first results set and makes corrections to the appropriate mappings between the elements of the first and second ontologies. The computer system 230 also determines that any mappings between elements of the first and second ontologies 20 and 30 that are not changed or corrected are "verified." By updating, verifying and/or correcting mappings between elements of the first and second ontologies 20 and 30, the computer system 230 "validates" the mapping between the first and second ontologies 20 and 30. The revisions to the final first results set may involve: correcting mappings between the second elements of the first and second ontologies 20 and 30, which mappings had not been previously corrected and/or verified (i.e., validated); updating mappings between first elements within the first and second ontologies 20 and 30 that have changed since those mapping were previously validated; and/or correcting errors that were previously not corrected when the mappings of the first elements were initially validated. The Financial Institution 2 forwards the further enhanced or validated final results set to the global ontology database computer system 210 for storage and access for future use by any entity who is a member of the standards body or the industry organization having ownership and control over the global ontology database 110. The updated, verified and/or corrected, i.e., further enhanced or validated, first results set replaces the prior first results set in the global ontology database 110. During each iteration of use of a mapping between first and second ontologies 20 and 30 stored in the database 110 by an entity, wherein the entity updates and/or corrects the mapping between the ontologies, the database 110 is made more certain and accurate when the updated, verified and/or corrected mapping, i.e., the further enhanced or validated mapping, is returned to the database 110.

It is contemplated that numerous entities may interact with the global ontology database 110 simultaneously. If two entities receive a mapping, for example, for the first and second ontologies 20 and 30 and create updated mappings for those ontologies at substantially the same time, the global ontology database computer system 210 will merge the two results sets once they are forwarded to the system 210 so as to create a single results set for the first and second ontologies 20 and 30. For example, the first entity may map first elements in the first ontology 20 with first elements in the second ontology 30. The second entity may map second elements in the first ontology 20 with second elements in the second ontology 30. The global ontology database computer system 210 will create a single results set for the first and second ontologies 20 and 30 comprising a mapping of the first and second elements of the first ontology 20 with the first and second elements of the second ontology 30.

As noted above with regard to step 303, if global ontology data 10 is stored in the global ontology database 110, the global ontology database computer system 210 attempts to determine if a mapping between the first and second ontologies 20 and 30 can be determined from the global ontology data 10. In attempting to determine if a mapping between the first and second ontologies 20 and 30 can be determined from the global ontology data 10, the computer system 210 first determines if the global ontology database 110 includes a results set comprising a direct mapping between the first and second ontologies 20 and 30. If a results set is stored in the global ontology database 110 comprising a direct mapping between the first and second ontologies 20 and 30, the computer system 210 determines that a mapping between the first and second ontologies 20 and 30 can be determined from the global ontology data 10, which is the results set from the global ontology database 110 comprising a direct mapping between the first and second ontologies 20 and 30. The global ontology database computer system 210 then forwards the results set to the Financial Institution 2 computer system 230. The results set is equivalent to the final first results set retrieved by the computer system 230 from the global ontology database computer system 210 in the example set out above involving a second customer, having a data card from Financial Institution 1, who makes a request to open an account at the Financial Institution 2. Hence, the results set comprising a direct mapping between the first and second ontologies 20 and 30 forwarded to the Financial Institution 2 computer system 230 by the computer system 210 may be used by the Financial Institution 2 computer system 230 in transferring personal data/financial data from a memory device storing personal data/financial data for a customer in accordance with the first ontology 20 to complete an application or form defined in accordance with the second ontology 30. After the data transferred has been verified and corrected by a user, corrections to the mappings between elements of the first and second ontologies 20 and 30 are inferred and the further enhanced or validated mapping between the first and second ontologies 20 and 30, i.e., an updated and corrected results set, is sent to the global ontology database computer system 210 for storage and access for future use by any entity who is a member of the standards body or the industry organization having ownership and control over the global ontology database 110, see step 312. The updated and corrected, i.e., further enhanced or validated, results set replaces the prior corresponding results set in the global ontology database 110.

If the global ontology data 10 does not contain a direct mapping between the ontologies 20 and 30, the computer system 210 may still be able to determine a direct mapping from the mappings found in the database 110 if any results sets contains a reference to either the first ontology 20 or the second ontology. In this regard, the computer system 210 determines if any results sets in the global ontology database 110 contains a reference to the first ontology 20 or the second ontology 30. If so, the computer system 210 attempts to determine a mapping between the first and second ontologies 20 and 30 from the global ontology data 10. If the global ontology database 110 does not contain any results sets involving the first ontology 20 or the second ontology 30, or the computer system 210 is unable to determine a mapping between the first and second ontologies 20 and 30 from the global ontology data 10 even though at least one results set contains a reference to the first ontology 20 or the second ontology 30, the computer system 210 determines it can not create a mapping between the first and second ontologies 20 and 30 based on the global ontology data 10 and uses an ontology mapping algorithm, as discussed above, to create a mapping between the first and second ontologies 20 and 30, see steps 304 and 306.

Figure 4:
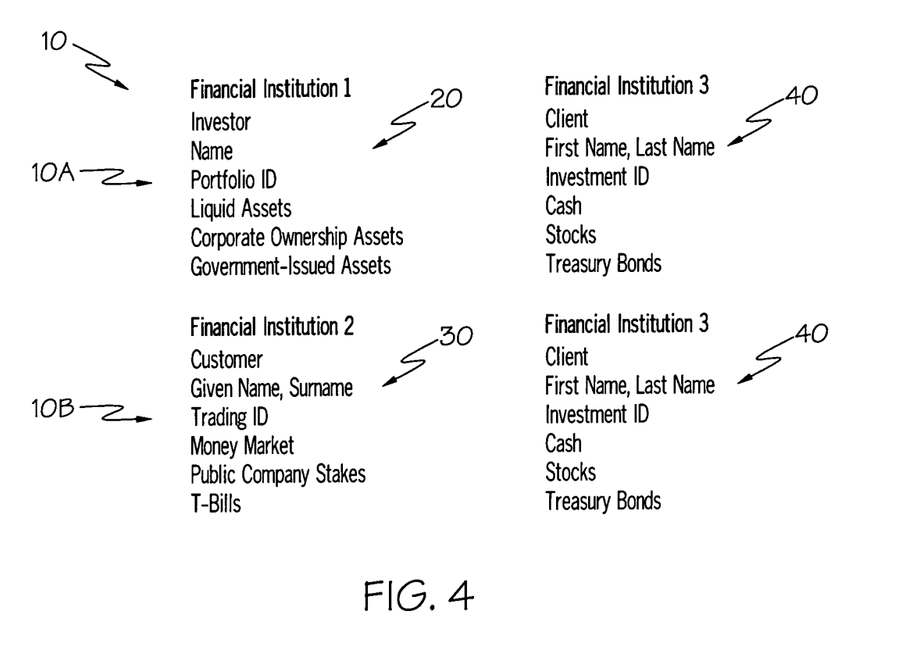
FIG. 4 is an illustration of a first example of global ontology data.
Figure 5:
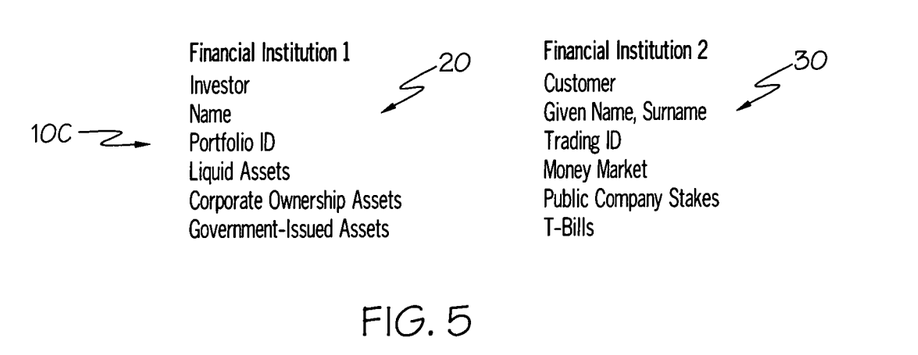
FIG. 5 is an illustration of a mapping between first and second ontologies determined based on mappings between first and third ontologies and second and third ontologies.

In FIG. 4, a first example of global ontology data 10 is illustrated. The data 10 comprises a first results set comprising a first mapping 10A between the first and third ontologies 20 and 40 and a second results set comprising a second mapping 10B between the second and third ontologies 30 and 40. Hence, the global ontology data 10 does not contain a direct mapping between the first and second ontologies 20 and 30, but does contain a reference to both the first ontology 20 and the second ontology 30. The computer system 210, using the results sets 10A and 10B from the global ontology database 110, attempts to determine a mapping between the first and second ontologies 20 and 30 using a conventional logical deduction engine, i.e., a prolog engine. A successful mapping 10C is illustrated in FIG. 5. In FIG. 5, "Investor" is equivalent or mapped to "Customer"; "Name" is equivalent or mapped to "Given Name, Surname"; "Porfolio ID" is equivalent or mapped to "Trading ID"; "Liquid Assets" is equivalent or mapped to "Money Market"; "Corporate Ownership Assets" is equivalent or mapped to "Public Company Stakes"; and "Government-Issued Assets" is equivalent or mapped to "T-Bills." If the computer system 210 using a logical deduction engine is unable to determine a mapping between the first and second ontologies 20 and 30, the computer system 210 determines a mapping between the first and second ontologies using an ontology mapping algorithm, as discussed above.

After determining the mapping 10C between the first and second ontologies 20 and 30, the computer system 210 forwards the results set to the Financial Institution 2 computer system 230, which will be referred to as an initial results set. The computer system 230 uses the initial results set to transfer relevant personal data/financial data from the first customer data card 200 or other memory device storing personal data/financial data for the first customer in accordance with the first ontology 20 to complete an application or form defined in accordance with the second ontology 30. The computer system 230 then transfers its completed form to the kiosk 212 for review by the first customer. The initial results set returned by the global ontology database computer system 210 to the Financial Institution 2 computer system 230 may contain errors in some of the mappings between elements of the first and second ontologies. These errors will result in either zero or incorrect personal data/financial data being input into corresponding entries on the form (created in accordance with the second ontology 30) completed by the computer system 230.

The kiosk 212 may display the completed form (created in accordance with the second ontology 30) to the first customer for correction of any errors. The kiosk 212 may also display a form from the Financial Institution 1 including elements from the first ontology 20 completed with personal data/financial data from the first customer. The completed Financial Institution 1 form is downloaded from the data card 200. The customer may correct the form defined in accordance with the second ontology 30 by typing in correct data and/or transferring data, e.g., drag-and-drop data, from the form (stored on the data card 200 and created in accordance with the first ontology 20) used by Financial Institution 1 to the form used by Financial Institution 2 (created in accordance with the second ontology 30). The computer system 230 interprets or infers from these changes in personal data/financial data revisions to the initial results set returned by the computer system 210. After all changes have been effected by the owner of the data card 200, the computer system 230 creates a validated results set corresponding to an updated and/or corrected mapping between the first and second ontologies 20 and 30. The Financial Institution 2 forwards the validated results set to the global ontology database computer system 210 for storage and access for future use by any entity who is a member of the standards body or the industry organization having ownership and control over the global ontology database 110, see step 308.

Figure 6:
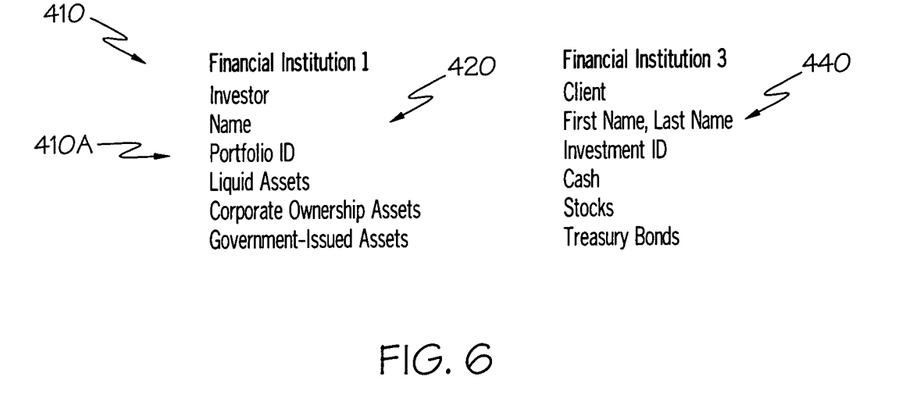
FIG. 6 is an illustration of a second example of global ontology data.
Figure 7:
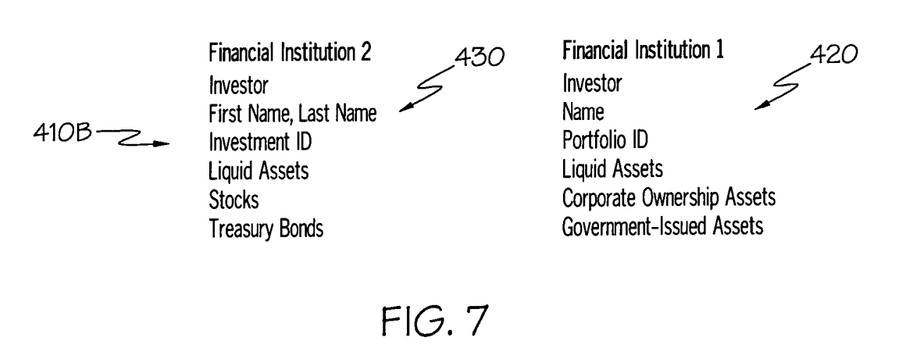
FIG. 7 is an illustration of a mapping between first and second ontologies determined based on a mapping between first and third ontologies.

In FIG. 6, a second example of global ontology data 410 is illustrated. The data 410 comprises a results set comprising a mapping 410A between a first ontology 420 and a third ontology 440. Hence, the global ontology data 410 does not contain a direct mapping between the first and second ontologies 20 and 30, but does contain a reference to the first ontology 420. The computer system 210, based on the results set 410A, attempts to determine a mapping between the first and second ontologies 420 and 430 using a conventional logical deduction engine, i.e., a prolog engine. A successful mapping 410B is illustrated in FIG. 7. As is apparent from a review of FIGS. 6 and 7, the elements "Investor" and "Liquid Assets" are common to both ontologies 420 and 430. Hence, those elements are mapped to one another. The remaining elements in the second ontology 430 "First Name, Last Name"; "Investment ID"; "Stocks"; and "Treasury Bonds" are found in the third ontology 440, which are mapped to corresponding elements in the first ontology 420. Hence, the elements "First Name, Last Name"; "Investment ID"; "Stocks"; and "Treasury Bonds" found in the second ontology 430 can be mapped to corresponding elements in the first ontology 420 based on the mapping 410A. Accordingly, "First Name, Last Name" is mapped to "Name"; "Investment ID" is mapped to "Portfolio ID"; "Stocks" is mapped to "Corporate Ownership Assets"; and "Treasury Bonds" is mapped to "Government-Issued Assets." If the computer system 210 using a logical deduction engine is unable to determine a mapping between the first and second ontologies 20 and 30, the computer system 210 determines a mapping between the first and second ontologies using an ontology mapping algorithm, as discussed above.

After determining the mapping 410B between the first and second ontologies 420 and 430, the computer system 210 forwards the results set to the Financial Institution 2 computer system 230, which will be referred to as an initial results set. The computer system 230 uses the initial results set to transfer relevant personal data/financial data from the first customer data card 200 or other memory device storing personal data/financial data for the first customer in accordance with the first ontology 20 to complete an application or form defined in accordance with the second ontology 30. The computer system 230 then transfers its completed form to the kiosk 212 for review by the first customer. The initial results set returned by the global ontology database computer system 210 to the Financial Institution 2 computer system 230 may contain errors in some of the mappings between elements of the first and second ontologies. These errors will result in either zero or incorrect personal data/financial data being input into corresponding entries on the form (created in accordance with the second ontology 30) completed by the computer system 230.

The kiosk 212 may display the completed form (created in accordance with the second ontology 30) to the first customer for correction of any errors. The kiosk 212 may also display a form from the Financial Institution 1 including elements from the first ontology 20 completed with personal data/financial data from the first customer. The completed Financial Institution 1 form is downloaded from the data card 200. The customer may correct the form defined in accordance with the second ontology 30 by typing in correct data and/or transferring data, e.g., drag-and-drop data, from the form (stored on the data card 200 and created in accordance with the first ontology 20) used by Financial Institution 1 to the form used by Financial Institution 2 (created in accordance with the second ontology 30). The computer system 230 interprets or infers from these changes in personal data/financial data revisions to the initial results set returned by the computer system 210. After all changes have been effected by the owner of the data card 200, the computer system 230 creates a validated results set corresponding to an updated and/or corrected mapping between the first and second ontologies 20 and 30. The Financial Institution 2 forwards the validated results set to the global ontology database computer system 210 for storage and access for future use by any entity who is a member of the standards body or the industry organization having ownership and control over the global ontology database 110, see step 308.

It is contemplated that a mapping may be effected in accordance with the flowchart illustrated in FIG. 3 for two ontologies corresponding to different domains of knowledge.

It is also contemplated that conventional security features may be provided so as to authenticate a customer providing a data card to an entity such as a Financial Institution. Such security features include biometrics, photo ID information stored on the card and displayed to an employee at an entity such as a Financial Institution, a personal identification number (PIN), and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of storing at least one validated results set in a global ontology database for future use by an entity that subscribes to said global ontology database comprising:
    determining, by a processor, if global ontology data is stored in a global ontology database;
    if global ontology data is stored in said global ontology database, attempting to determine a mapping between first and second ontologies from said global ontology data;

if a mapping between said first and second ontologies is determined from said global ontology data, validating said mapping between said first and second ontologies, and defining said validated mapping as a validated first results set;

if global ontology data is not stored in said global ontology database or a mapping between said first and second ontologies is not determined from said global ontology data stored in said global ontology database, unifying said first and second ontologies by determining a mapping between said first and second ontologies, validating said mapping between said first and second ontologies, and defining said validated mapping as a validated first results set;

if global ontology data is stored in said global ontology database and said global ontology data includes a results set comprising a mapping between said first and second ontologies, determining the mapping between said first and second ontologies by retrieving said mapping between said first and second ontologies from said global ontology database, validating said mapping between said first and second ontologies, and defining said validated mapping as a validated first results set;

wherein said validating said mapping between said first and second ontologies comprises inferring corrections to mappings between elements of said first and second ontologies from corrections made by a user to data; and storing said validated first results set in said global ontology database for future use by an entity that subscribes to said global ontology database.

2. A method as set forth in claim 1, further comprising:

if global ontology data is stored in said global ontology database, attempting to determine a mapping between third and fourth ontologies from said global ontology data;

if a mapping between said third and fourth ontologies can be determined from said global ontology data, validating said mapping between said third and fourth ontologies, and defining said validated mapping as a validated second results set;

if a mapping between said third and fourth ontologies is not determined from said global ontology data stored in said global ontology database, unifying said third and fourth ontologies by determining a mapping between said third and fourth ontologies, validating said mapping between said third and fourth ontologies, and defining said validated mapping as a validated second results set;

providing said validated second results set to said global ontology database; and storing said validated second results set in said global ontology database.

3. The method of claim 1, wherein if global ontology data is stored in said global ontology database and said global ontology data comprises a mapping between said first ontology and a third ontology and a mapping between said second ontology and said third ontology, determining a mapping between said first and second ontologies from said mappings of said first and third ontologies and said second and third ontologies.

4. The method of claim 1, wherein said validating said mapping between said first and second ontologies comprises inferring corrections to mappings between elements of said first and second ontologies from corrections made by a user to data transferred from a form generated in accordance with said first ontology to a form generated in accordance with said second ontology.

5. The method of claim 1, further comprising:

providing personal data arranged in accordance with said first ontology to an entity having control over a database created in accordance with said second ontology;

said entity verifying the identity of a customer providing said personal data using a security feature; and transferring said personal data to said database created in accordance with said second ontology.

6. A method of storing at least one validated results set in a global ontology database for future use by an entity that subscribes to said global ontology database comprising:

determining, by a processor, if global ontology data is stored in a global ontology database;

if global ontology data is stored in said global ontology database, attempting to determine a mapping between first and second ontologies from said global ontology data;

if a mapping between said first and second ontologies is determined from said global ontology data, validating said mapping between said first and second ontologies, and defining said validated mapping as a validated first results set;

if global ontology data is not stored in said global ontology database or a mapping between said first and second ontologies is not determined from said global ontology data stored in said global ontology database, unifying said first and second ontologies by determining a mapping between said first and second ontologies, validating said mapping between said first and second ontologies, and defining said validated mapping as a validated first results set;

if global ontology data is stored in said global ontology database and said global ontology data includes a results set comprising a mapping between said first and second ontologies, determining the mapping between said first and second ontologies by retrieving said mapping between said first and second ontologies from said global ontology database, validating said mapping between said first and second ontologies, and defining said validated mapping as a validated first results set;

wherein said validating said mapping between said first and second ontologies comprises inferring updates or corrections to mappings between elements in said first and second ontologies from corrections made by a user; and storing said validated first results set in said global ontology database for future use by an entity that subscribes to said global ontology database.

* * * * *